United States Patent
Buck

[11] 3,782,803
[45] Jan. 1, 1974

[54] SIMPLIFIED FLAT MIRROR SCANNER
[76] Inventor: Willard E. Buck, P.O. Box 671, Lake Havasu City, Ariz. 86403
[22] Filed: Oct. 12, 1971
[21] Appl. No.: 188,115

[52] U.S. Cl.......................... 350/7, 178/7.6, 350/294
[51] Int. Cl. ............................................ G02b 17/00
[58] Field of Search ................... 350/6, 7, 285, 293, 350/294, 296; 178/7.6

[56] References Cited
UNITED STATES PATENTS
| | | | |
|---|---|---|---|
| 3,520,586 | 7/1970 | Bousky | 350/285 |
| 3,554,628 | 1/1971 | Kennedy | 350/7 |
| 3,531,785 | 9/1970 | Corcoran | 350/7 |

*Primary Examiner*—Ronald L. Wibert
*Assistant Examiner*—Michael J. Tokar
*Attorney*—William C. Cahill et al.

[57] ABSTRACT

A system is disclosed for translating a collimated beam of light, such as that generated by a laser, into a raster scan on a planar target. The laser beam is directed at a first rotating mirror provided with a plurality of faces from which it is redirected toward a first stationary mirror with the first rotating mirror causing a linear sweep across the concave face of the first stationary mirror. From the first stationary mirror, the laser beam is directed toward a second multiface rotating mirror disposed beyond the focal point of the first stationary mirror. The second rotating mirror imparts a second scan direction to the laser beam which is substantially normal to the first scan direction. From the second rotating mirror, the laser beam is redirected toward a second stationary concave mirror from which it is redirected in a raster scan to a planar target disposed at a distance from the secondary stationary mirror at which the beam is substantially in focus. A line scan embodiment of the invention is achieved by directing the beam from the laser directly onto the second rotating mirror.

5 Claims, 1 Drawing Figure

PATENTED JAN 1 1974  3,782,803
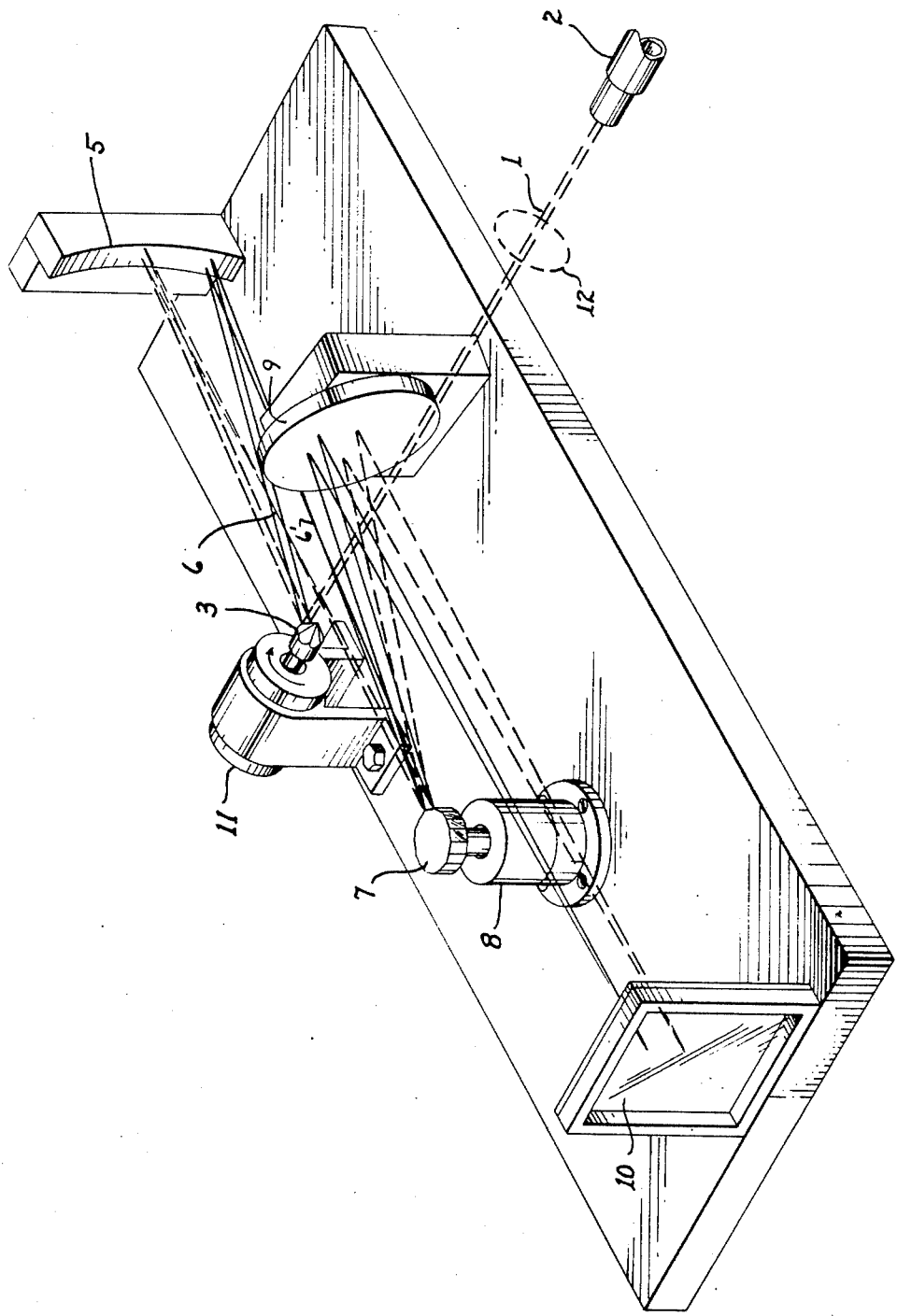
INVENTOR.
WILLARD E. BUCK
BY
Cahill, Sutton, Thomas & Phillips
ATTORNEYS

SIMPLIFIED FLAT MIRROR SCANNER

This invention relates to scanning apparatus and, more particularly, to apparatus for developing a raster scan on a planar surface from a collimated beam of light.

Optical systems for translating a collimated beam of light into a raster scan are known in the prior art. However, the prior art systems are generally characterized either by considerable complexity or by limited performance. More specifically, the high performance prior art systems utilize a plurality of rotating mirrors which may have many faces disposed circumferentially about the axis of rotation. In order to achieve a high scan rate, many faces are required to avoid a cumbersome size which causes problems at high rotational rates. Conversely, it is difficult and expensive to achieve a multiface mirror within the necessary tolerances so long as the physical size is restricted. A problem which has been associated with the more modest system is that the raster scan achieved is typically not focused across the entire surface of a planar target and, in fact, can only be brought into focus on a curved target area. Therefore, it will be appreciated that it would be desirable to provide a relatively simple optical system for translating a collimated beam of light into a planar raster scan.

It is therefore a broad object of this invention to provide an improved scanning apparatus for translating a collimated beam of light into a planar raster scan.

It is a further object of this invention to provide such scanning apparatus utilizing optical elements which are relatively simple and may be economically produced.

It is a still further object of this invention to provide such scanning apparatus in which the rotating mirrors require a modest number of faces and are therefore relatively easy to prepare within the necessary tolerances to achieve minimum dead time and maximum uniformity from face to face.

Yet another object of this invention is to provide scanning apparatus in which all elements of the scanning system are reflective and therefore performs equally as well with light of different wave lengths.

The invention in its various manifestations will become more readily apparent to those skilled in the art through a perusal of the following specification taken in conjunction with the subjoined claims and the single FIGURE which is a perspective view of a preferred embodiment of the invention.

Referring now to the single FIGURE, it will be observed that a collimated beam of light 1 is directed from a source, such as the laser 2, to one side of the axis of rotation of a pyramidal mirror 3. As will be understood from the description that follows, the pyramidal mirror 3, by virtue of its rotation, imparts the vertical scan function to the collimated beam in its translation into a raster sweep. Hence, those skilled in the art will appreciate that the pyramidal mirror 3 need not rotate at extremely high peripheral velocities nor does it require a very high number of faces. In the embodiment presented, the pyramidal mirror 3 is provided with six equally spaced faces, each disposed at an angle of 45° with respect to the axis of rotation. Hence, the collimated beam of light 1 is redirected through an angle of 90° and, as the collimated beam 1 impinges on each successively passing face of the pyramidal mirror 3, a vertical sweep through an angle of 30° is achieved. Assuming rotation in the direction indicated by the arrow on the motor 4, the sweep will be repetitively downward with very little dead time because of the abrupt definition between adjacent faces of the pyramidal mirror 3.

The sweeping beam of light, represented by the dashed lines, reflected from the faces of the pyramidal mirror 3 is directed to the face of a concave stationary mirror 5 which has suitable height to accommodate the entire sweep imparted by the rotating pyramidal mirror 3. The stationary concave mirror 5 has a face curvature approximating a spherical section or a symmetrical section from the minor diameter of an elliptical spheroid.

The stationary mirror 5 is canted slightly with respect to the plane defined by the beam sweeping between the rotating pyramidal mirror 3 and the stationary mirror 5 such that the beam reflected from the stationary mirror 5 passes just clear of the pyramidal mirror 3 as shown in the single FIGURE.

As previously noted, the stationary mirror 5 is either a spherical section or a section from an elliptical spheroid such that the beam is brought to a focus at a point 6 which is at a distance from the surface of the stationary mirror 5 related to the curvature of the surface in accordance with principals well known in the art. After the beam of light passes through the point 6, which will be one of a family of points described as the beam sweeps vertically, the beam diverges. The position of the point 6 is predetermined to occur at a position which will ultimately result in the beam being focused on the target as will be more readily appreciated from the remainder of the description.

The laser beam, diverging after passing through the point 6, is intercepted by one of the faces of a rotating mirror 7 which is driven by a motor 8. The function of the rotating mirror 7 is to impart a horizontal scan dimension to the laser beam which is already scanning in the vertical direction. Inasmuch as the horizontal scan rate must be much slower, in the embodiment shown, than the vertical scan rate, the rotating mirror 7 is provided with substantially more faces than the rotating mirror 3, and the motor 8 turns at a much slower angular rate than the corresponding motor 4. The light beam from the first stationary mirror 5 is directed onto the faces of the rotating mirror 7 slightly to one side of the axis of rotation such that the light reflected from the successively passing faces of the rotating mirror 7 is redirected at an acute angle and continues to diverge until it impinges upon the surface of a second stationary concave mirror 9.

The second stationary mirror 9 is ideally ground as an off-axis parabola; however, it has been found that a spherical section, which is much easier to fabricate, is entirely adequate for most applications. The function of the second stationary mirror 9 is to redirect the laser beam toward the planar target 10 and to bring the beam into focus at the surface of the target. It will be observed that the second stationary mirror 9 accepts the incoming beam as if the exemplary focal point 6 were an extension through the second rotating mirror 7 to a position substantially in the plane defined by the planar target 10. Inasmuch as the resulting raster sweep at the planar target 10 is in focus throughout the nominal target area, those skilled in the art will understand that the laser beam is substantially normal to the plane defined by the target 10 and the second stationary mirror 9 such that the mirror 9 must be sufficiently large to accommodate the entire nominal target area.

Assuming that the rotating mirror 3 has moved in the direction indicated a few degrees, the beam will take the path to the target 10 indicated by the solid lines which, it will be observed, strikes the first stationary mirror 5 at a lower point, focuses at a point 6', and impinges upon a face of the rotating mirror 7 from which it is reflected to the second stationary mirror 9 at a position higher than the previously described condition. Therefore, the beam is now focused by the second stationary mirror 9 on the target 10 at a point directly above the point of impingement previously described. It is essential to note that the light bundle impinges upon the reflective faces of the rotating mirror 7 at a stationary position and that the light bundles passing from the stationary mirror 9 to the target 10 move parallel to achieve a line scan on the target 10, the lines being shifted horizontally in accordance with the rate of rotation of the mirror 7.

It will be seen from a perusal of the single FIGURE and the foregoing discussion that planar scanning has been achieved utilizing relatively simple and inexpensive components. Planar scanning of almost any practical size may be achieved by re-orienting the various components and utilizing a second stationary mirror 9 of adequate size. The field angle can be adjusted by altering the positions of the two rotating mirrors. It will be observed that for the scan rates contemplated, a relatively small number of faces is required on the high-speed rotating mirror 3, and it is therefore possible to secure sharp definition between adjacent mirror faces with correspondingly low dead time because the laser beam impinges on a very small area on both rotating mirrors thereby realizing a high off-to-on ratio. Another advantage of focusing the beam within the family of points exemplified by the point 6 is that the components are relatively small and therefore high frequency response can be achieved without undue difficulty caused by rotating bodies having high inertia.

Certain detail changes can be introduced to accommodate the scan system to certain operating requirements and environments. For example, the focal point 6 of the collimated beam reflected from the first stationary concave mirror 5 can be shifted by introducing a lens 12 into the collimated light beam 1 issued from the laser 2 before it impinges upon the first rotating mirror 3. The lens 12, by focusing the beam 1 in such a manner that the bundle is diverging when it impinges upon the stationary mirror 5 and is larger than the collimated beam issued from the source, 2 alters the focal length of the system in such a manner that the target 10 may be moved further from the mirror 9. Similarly, if the lens 12 is placed to provide a smaller light bundle impinging upon the mirror 5, the target 10 may be moved closer to the stationary mirror 9. In another contemplated configuration, the first rotating mirror 3 may assume the form of the rotating mirror 7 rather than the pyramidal form disclosed in the single FIGURE. The collimated beam from the laser 2 would then preferably be disposed in the plane described by the vertically sweeping beam between the first rotating mirror 3 and the first stationary mirror 5. However, those skilled in the art will appreciate that the use of the pyramidal mirror 3 has the advantage of bringing about a vertical sweep through an angle equal to the angle between adjacent faces whereas, multiface mirrors, such as the mirror 7, bring about a doubling of the swept angle.

It will be readily apparent that, if only linear scan is desired, that the laser beam may be directed at the mirror 7 from a position occupied in the drawing by the mirror 5 or in such other position and with utilization of a converging lens, similar to the lens 12, to provide focus at the point 6. In this configuration, the rotating mirror 7 redirects the beam to the stationary mirror 9 to provide repetitive horizontal sweep along a line on the target 10.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. Apparatus for providing uniform scan from a source of collimated light of any wave length comprising:
   A. means for generating a collimated beam of light;
   B. focusing means for focusing said beam such that it diverges after passing through a focal point;
   C. a rotating mirror provided with a plurality of faces equally circumferentially disposed about its axis of rotation, said rotating mirror being disposed to receive said diverging beam such that said diverging beam is redirected to sweep unidirectionally through a predetermined arc of a magnitude according to the number of faces on said rotating mirror;
   D. a stationary mirror disposed to intercept and redirect said diverging beam of light from said rotating mirror as a converging beam, said stationary mirror having at least one finite focusing point; and
   E. a planar target disposed generally at the line in which said collimated beam is substantially in focus.

2. Apparatus for providing a uniform raster scan on a planar target from a light source of any wavelength comprising:
   A. means for generating a collimated beam of light;
   B. a first rotating mirror having a plurality of equal faces, said first rotating mirror being disposed in the path of said collimated beam such that said faces serially intercept and redirect said beam causing said beam to sweep repeatedly and unidirectionally through a first predetermined arc, the angle of said first predetermined arc being of a magnitude according to the number of faces on said first rotating mirror;
   C. a first stationary mirror, said first stationary mirror being disposed in the path of said collimated beam of light as it sweeps through said first predetermined arc and being of sufficient dimension to intercept and redirect said collimated beam of light as a converging beam as it sweeps through the entirety of said first predetermined arc, said first stationary mirror having at least one predetermined focal point, said converging beam translating into a diverging beam after passing through said focal point;
   D. a second rotating mirror provided with a plurality of faces equally circumferentially disposed about its axis of rotation, said second rotating mirror being disposed to receive said diverging beam of light reflected from said first stationary mirror such that said diverging beam is redirected to sweep unidirectionally through a second predetermined arc of a magnitude according to the number of faces on said second rotating mirror;

E. a second stationary mirror disposed to intercept and redirect said diverging beam of light from said second rotating mirror as a converging beam, said second stationary mirror having at least one finite focus point; and F. a planar target disposed generally at the plane in which said collimated beam is substantially in focus.

3. The apparatus of claim 2 in which said first rotating mirror is positioned beyond the focal point of said first stationary member such that said diverging beam of light impinging upon the faces of said second rotating mirror remains stationary.

4. The apparatus of claim 3 in which the distance between the focal point of said first stationary mirror and the distance between the reflecting face of said second rotating mirror instantaneously intercepting said diverging beam to said second stationary mirror equals the focal length of said second stationary mirror.

5. The apparatus of claim 4 in which a converging lens is introduced between the beam issuing from said means for generating a collimated beam of light and said first rotating mirror thereby altering the system focal length.

* * * * *